United States Patent [19]

Rice et al.

[11] Patent Number: 5,030,251
[45] Date of Patent: Jul. 9, 1991

[54] SYSTEM AND METHOD FOR SEPARATING A PORTION OF A GAS FROM A MIXTURE OF GASES

[75] Inventors: Arthur W. Rice, O'Fallon; John G. Brown, Jr., University City, both of Mo.

[73] Assignee: Permea, Inc., St. Louis, Mo.

[21] Appl. No.: 601,619

[22] Filed: Oct. 24, 1990

Related U.S. Application Data

[63] Continuation of Ser. No. 429,296, Oct. 30, 1989, abandoned.

[51] Int. Cl.$^5$ .............................................. B01D 53/22
[52] U.S. Cl. .......................................... 55/16; 55/68; 55/158
[58] Field of Search ............... 55/16, 68, 158, 31, 55/33, 35

[56] References Cited

U.S. PATENT DOCUMENTS

| | | | |
|---|---|---|---|
| 3,735,558 | 5/1973 | Skarstrom et al. | 55/16 |
| 4,675,030 | 6/1987 | Czarnecki et al. | 55/16 |
| 4,685,940 | 8/1987 | Soffer et al. | 55/16 X |
| 4,718,921 | 1/1988 | Makino et al. | 55/16 |
| 4,783,201 | 11/1988 | Rice et al. | 55/16 |
| 4,944,776 | 7/1990 | Keyser et al. | 55/16 |

FOREIGN PATENT DOCUMENTS

| | | | |
|---|---|---|---|
| 2618082 | 1/1989 | France | 55/158 |
| 54-013653 | 2/1979 | Japan | 55/158 |

*Primary Examiner*—Robert Spitzer
*Attorney, Agent, or Firm*—Martha A. Michaels

[57] ABSTRACT

A system for separating a portion of a first gas from a gaseous feed comprising a mixture of gases that is intermittently supplied to the system. The system comprises a membrane gas separator having at least one membrane through which the first gas permeates preferentially in comparison to other gases contained in the mixture. The separator is adpated to produce a nonpermeate gaseous product which is discharged from a nonpermeate gas side of the separator and in which the concentration of the first gas is lower than in the feed mixture. The system also includes a mechanism for supplying a gaseous purge stream to the separator when the feed mixture is not being supplied to the system. The concentration of the first gas is lower in the gaseous purge stream than in the feed mixture to purge residual amounts of the first gas contained in the membrane of the separator. The method of separating gases from an intermittently supplied feed is also disclosed.

21 Claims, 1 Drawing Sheet

SYSTEM AND METHOD FOR SEPARATING A PORTION OF A GAS FROM A MIXTURE OF GASES

This is a continuation of application Ser. No. 429,296, filed Oct. 30, 1989, now abandoned.

BACKGROUND OF THE INVENTION

This invention relates generally to membrane gas separators, and in particular to a system and method using a membrane gas separator for separating a portion of a gas from an intermittently supplied feed.

Membrane gas separators are commonly used to remove a portion of a first gas from a gaseous feed to produce a desired product. For example, the PRISM ® CACTUS ® dryer, manufactured by Permea, Inc., St. Louis, Mo., removes water vapor from a moist air feed to produce a drier air product. In this type of dryer, moist air is fed through a bundle of tubular membranes. The membranes are porous so that some of the air permeates through the sidewalls of the membranes; the balance of the feed passes through the membranes without permeating the sidewalls. Because of the materials selected for the membranes and the way the membranes are constructed, water vapor permeates through the sidewall at a faster rate than do the other gases of the moist air feed. Because water vapor is more quickly permeated than the other gases, the portion of the feed which does not permeate through the membranes, i.e., the nonpermeate product, has a lower concentration of water vapor than does the feed.

This type of separator is quite effective during continuous (steady state) operation. However, the operation of this type of separator when the feed is supplied intermittently is often not as effective. The inventors have discovered that this may be due to the fact that some residual water vapor remains in the separator when flow through the separator is stopped. When the flow is restarted, the residual water vapor flows out with the nonpermeate product rather than permeating the membrane sidewalls. Thus, the nonpermeate product exiting the separator during restart is not as dry as product exiting the separator during steady state operation. Therefore, in a system in which feed to the membrane separator is frequently cycled on and off, the membrane separator loses effectiveness.

SUMMARY OF THE INVENTION

Among the objects of the present invention may be noted the provision of a system and method using a gas membrane separator with improved effectiveness during cyclical operation when feed gas is supplied intermittently; and the provision of an intermittently operated membrane gas separator system which provides for a purge of the membrane separator between cycles.

Generally, a system of the present invention is adapted for separating a portion of a first gas from a gaseous feed comprising a mixture of gases that is intermittently supplied to the system. The system comprises a membrane gas separator having at least one membrane through which the first gas permeates preferentially in comparison to other gases contained in said mixture. The separator is thereby adapted to produce a nonpermeate gaseous product which is discharged from a nonpermeate gas side of the separator and in which the concentration of the first gas is lower than in the feed mixture. The system also includes means for supplying a gaseous purge stream to the separator when the feed mixture is not being supplied to the system. The concentration of the first gas is lower in the gaseous purge stream than in the feed mixture to purge residual amounts of the first gas contained in the membrane of the separator.

Generally, according to the method of the present invention, a portion of a first gas is separated from a gaseous feed comprising a mixture of gases. The gaseous feed is intermittently conducted under pressure through a membrane gas separator. The separator is of the type including at least one membrane through which the first gas permeates preferentially in comparison to other gases contained in the mixture to produce a nonpermeate gaseous product at the nonpermeate gas side of the separator in which the concentration of the first gas is lower than in the feed mixture. According to this method, a gaseous purge stream is supplied to the separator when the feed mixture is not being conducted through the separator. The concentration of the first gas is lower in the gaseous purge stream than in the feed mixture to purge residual amounts of the first gas contained in the membrane of the separator. This reduced the amount of the first gas that is introduced into the nonpermeate stream on start up.

Thus, with the system and method of the present invention, the first gas is more effectively separated from the feed mixture during intermittent operation.

These and other advantages will be in part apparent and in part pointed out hereinafter.

BRIEF DESCRIPTION OF THE DRAWINGS

Corresponding reference numerals indicate corresponding parts throughout the several views of the drawings.

DETAILED DESCRIPTION OF THE PREFERRED EMBODIMENTS

Figure 1:
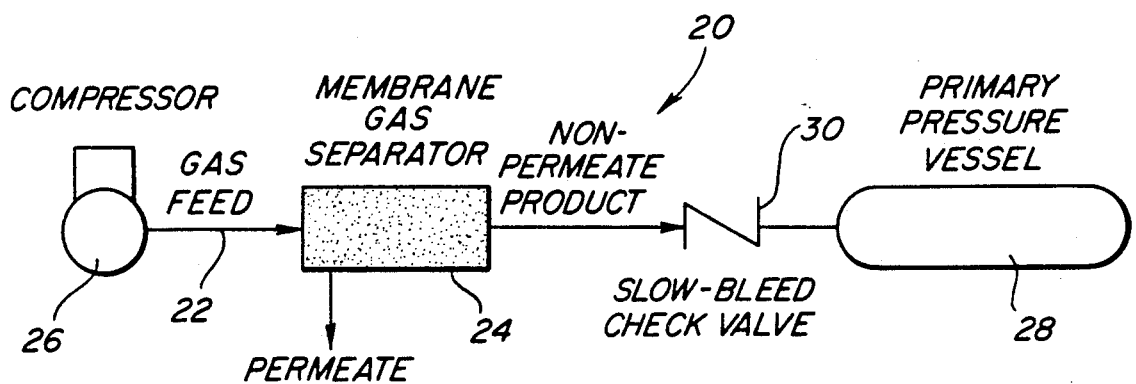
FIG. 1 is a schematic diagram of a first embodiment of the present invention in which a gaseous purge stream is supplied to the separator by a slow-bleed check valve.

FIG. 1 is a schematic view of a system 20 constructed according to the principles of this invention. In the system 20, a gaseous feed 22 is intermittently (or cyclically) supplied under pressure to a membrane gas separator 24 from a compressor 26. The gaseous feed 22 comprises a mixture of gases. The system 20 is adapted for separating a portion of a first gas from the feed 22. By way of example only, the gaseous feed 22 is described herein as constituting moist or saturated air and the first gas is described as constituting water vapor. Thus, the system 20 is described as a system for dehydrating air. However, it is to be understood that this invention is not limited to separating water vapor from moist air and applies to the separation of any gas from a feed.

The gas separator 24 has a bundle of hollow fiber membranes having bores through which the moist air is fed. The membranes are porous so that a portion of the air permeates out the sidewalls of the membranes; the balance of the feed passes through the hollow tubular membranes without permeating out the sidewalls. The tubular membranes are constructed so that water vapor permeates the sidewalls preferentially, i.e., at a faster rate, in comparison to the other gases contained in the gaseous feed 22. The permeate product, i.e., the portion of the stream which permeates out the sidewalls of the membranes, is vented out of the separator 24. The nonpermeate product, i.e., the portion of the air stream which passes through the bores of the tubular membranes without permeating out the sidewalls, is discharged from a nonpermeate gas side of the separator 24 and transferred into a pressure vessel 28. Because the permeate product contains proportionally more water vapor, the nonpermeate product contains proportionally less vapor. An example of a suitable gas separator 24 is described in greater detail in U.S. Pat. No. 4,783,201 to Rice et. al., incorporated herein by reference.

When the flow of gaseous feed to the separator 24 is stopped, some residual water vapor remains in the separator 24. When the flow is restarted this residual water vapor would flow out with the nonpermeate product. According to this invention this residual water vapor is removed from the separator by a purge stream which is supplied to the separator 24 at times when the feed is not being supplied to the separator 24. The removal of the residual water vapor prevents it from being entrained in the nonpermeate product when the gaseous feed is restarted, thereby improving the efficiency of the removal.

In the first embodiment, the purge stream is supplied to the separator 24 by way of a slow-bleed check valve 30 positioned between the pressure vessel 28 and the separator 24. When the compressor 26 is cycled off, the air pressure at the nonpermeate side of the separator 24 reduces to atmospheric pressure; then, because the pressure in the pressure vessel 28 is greater than atmospheric pressure, some of the stored nonpermeate product bleeds back through the valve 30 and through the separator 24 to form the purge stream. Thus, the valve 30 constitutes means for supplying the purge stream to the separator 24 when the feed 22 is not being supplied to the separator 24. The valve 30 also constitutes means for supplying a portion of the nonpermeate product from the pressure vessel 28 to the nonpermeate side of the separator 24. Because the purge stream is formed from a portion of the stored nonpermeate product it is relatively dry and, therefore, the residual water vapor more readily evaporates as the stream of dry air passes rearwardly through the separator 24. In fact, the wet-bulb temperature of the purge stream decreases as it is expanded back through the valve 30. Thus, the purge stream is quite effective in purging the residual water vapor from the separator 24.

In operation, the compressor 26 intermittently forces a moist air stream through the separator 24. Because the air from the compressor 26 is pressurized, it is generally saturated with water vapor. As it passes through the separator 24, some of the stream permeates through the sidewalls of the membranes in the separator 24 and is discarded. The nonpermeate portion of the stream exits the nonpermeate end of the separator 24 and enters the pressure vessel 28. Because the water vapor permeates out the sidewalls of the membranes at a faster rate than do the other gases in the air stream, the nonpermeate portion has a lower concentration of water vapor than does the air stream from the compressor 26. When the compressor 26 is cycled off, some of the nonpermeate product stored in the pressure vessel 28 bleeds through the check valve 30 and flows to the nonpermeate side of the separator 24 to purge residual amounts of water vapor contained in the membranes. Thus, when the compressor 26 is cycled back on, the residual water vapor will not be entrained in the nonpermeate product, and will not be carried to the pressure vessel 28 by the nonpermeate product.

Figure 2:
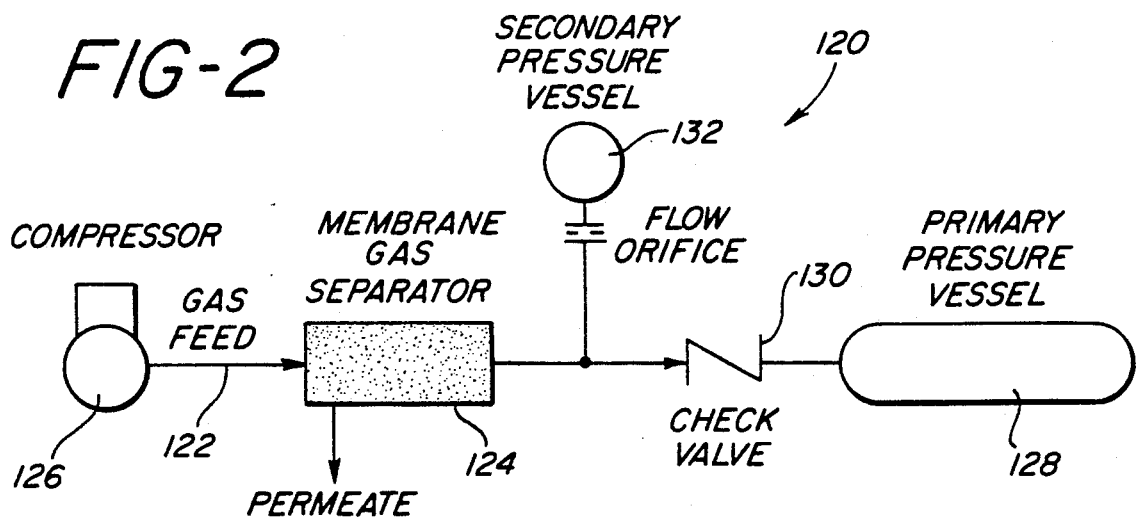
FIG. 2 is a schematic diagram of a second embodiment of the present invention in which a gaseous purge stream is supplied to the separator by a secondary storage tank.

FIG. 2 is schematic view of a second system 120 constructed according to the principles of this invention. The system 120 is similar to the system 20 of FIG. 1. However, the slow-bleed check valve 30 is replaced with a standard check valve 130 and a secondary pressure vessel 132 is included in the system 120. All other components of the two systems are identical, but, for ease of discussion, all reference numbers for the system of FIG. 2 include the prefix "1", e.g. separator 24 in the first embodiment is equivalent to the separator 124 in this second embodiment.

In the system 120, the nonpermeate product from the separator 124 is stored in both the pressure vessel 128 (the primary pressure vessel) and the secondary pressure vessel 132. The check valve 130 prevents any back-flow of the stored product from the primary vessel 128. However, there is preferably no valve positioned between the secondary vessel 132 and the separator 124. Thus, when the compressor 126 is cycled off, the pressure in the secondary vessel 132 is greater than the pressure in the separator and, consequently, the nonpermeate product stored in the secondary vessel 132 flows back through the nonpermeate side of the separator 124. Alternatively a throttling valve or some other valve could be provided to control the flow of gas from secondary vessel 132. The secondary vessel 132 constitutes means for supplying the purge stream to the separator 124 when the feed 122 is not being supplied to the separator 124.

The system 120 is particularly beneficial in a system in which the compressor 126 is cycled off for relatively long periods of time. When the compressor 126 is cycled off, the back-flow of stored nonpermeate product from the secondary vessel 132 is sufficient to purge the residual water vapor from the separator 124 without the need to deplete any of the nonpermeate product stored in the primary vessel 128.

Of course, some other source of gas may be provided to purge the separators 24 or 124 without departing from the principles of this invention.

EXAMPLE 1-3

The dew point is the temperature at which air is saturated with moisture; the lower the dew point, the drier the air. In the use of the present invention it is desirable to reduce the dew point of the air to a satisfactory temperature.

In Example 1, the system tested was similar to the system 20 of FIG. 1 except that the slow bleed check valve 30 was not activated and the compressor 26 was cycled in the "on" position for about 6-10 minutes. The dew point temperatures of the product shown in the table for Example 1 were taken near the end of the on-cycle. As a result, the system in Example 1 approximated a continuous operation. It should be noted that the dew point depression, i.e., the amount by which the dew point was reduced, was about 35° C. and 30° C. on the respective dew point readings of the initial feed of 46° C. and 42° C. The reduction of the dew point by these temperatures provides a satisfactory end product with a dew point less than 15° C. where the initial dew point readings were in the 40's.

In Example 2, the compressor 26 was cycled "on" for 40 seconds and cycled "off" from 50-60 seconds. In this instance it should be noted that dew point depressions were between 20° C. and 23° C. for feed dew points of 30° C. and 37° C. The dew point depressions in Example 2 indicate decided reductions in moisture content of the air; however, the reductions are not as great as those of Example 1. This exemplifies the problem presented when a system frequently cycles on and off.

The system tested in Example 3 was the same type as the system 20 of FIG. 1 and therefore includes the slow-bleed check valve 30. In Example 3, unlike either Example 1 or 2, a back bleed flow of 0.05 ScFM was supplied through the check valve 30 back to the separator 24 when the compressor was cycled off. In spite of the cycles, it can be noted from the table representing the values for Example 3 that the dew point depressions were again approximately 30°-35° C.

In all three examples, the feed 22 constituted moisture saturated air and was supplied to the separator 24 at temperatures of 30° C. to 51° C., pressures of 80 to 100 psig, and a flow rate of approximately 7.5 ScFM. The separator 24 used in all three examples was a Model ppc-5 separator manufactured by Permea, Inc. The results of the tests are set forth in Tables 1, 2 and 3 below.

TABLE 1

| Feed dew point (°C.) | Product dew point (°C.) | Dew point depression (°C.) |
| --- | --- | --- |
| 46 | 11.1 | 34.9 |
| 42 | 12.5 | 29.5 |

TABLE 2

| Feed dew point (°C.) | Product dew point (°C.) | Dew point depression (°C.) |
| --- | --- | --- |
| 37 | 14.9 | 22.1 |
| 36 | 15.0 | 21.0 |
| 30 | 9.4 | 20.6 |

TABLE 3

| Feed dew point (°C.) | Product dew point (°C.) | Dew point depression (°C.) |
| --- | --- | --- |
| 51 | 15.7 | 35.3 |
| 41 | 9.5 | 31.5 |
| 40 | 7.4 | 32.6 |
| 38 | 7.1 | 30.9 |
| 37 | 4.7 | 32.3 |
| 31 | 2.5 | 28.5 |
| 30 | −0.2 | 30.2 |

These results show that for systems with rapid cycle times, providing a dry purge stream to the nonpermeate side of the separator during the off-cycle increases the effectiveness of the separator.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A method of separating a portion of a first gas from a gaseous feed comprising a mixture of gases, the method comprising the steps of:
   intermittently conducting the gaseous feed under pressure through a membrane gas separator having at least one membrane through which the first gas permeates preferentially in comparison to another gas contained in the mixture to produce a nonpermeate gaseous product which is discharged from a nonpermeate gas side of the separator and in which the concentration of the first gas is lower than in the feed mixture;
   supplying a gaseous purge stream comprised of nonpermeate gaseous product to the nonpermeate side of the separator when the feed mixture is not being conducted through the separator, the concentration of the first gas being lower in the gaseous purge stream than in the feed mixture, whereby to purge residual amounts of the first gas contained in the membrane of the separator.

2. The method of claim 1 further comprising an intermediate step of storing at least a portion of the nonpermeate gaseous product in a pressure vessel and wherein the step of supplying the gaseous purge stream to the nonpermeate gas side of the separator comprises supplying at least a portion of the nonpermeate gaseous product from the pressure vessel to the separator.

3. The method of claim 1 further comprising an intermediate step of storing at least a portion of the nonpermeate gaseous product in a pressure vessel and wherein the step of supplying the gaseous purge stream through the separator comprises the steps of expanding at least a portion of the nonpermeate gaseous product from the pressure vessel and supplying the expanded product to the nonpermeate gas side of the separator.

4. The method of claim 3 wherein the step of expanding the nonpermeate gaseous product comprises allowing a portion of the stored gaseous product to bleed back through a slow-bleed check valve.

5. The method of claim 1 further comprising an intermediate step of storing a first portion of the nonpermeate gaseous product in a primary pressure vessel and storing a second portion of the nonpermeate gaseous product in a secondary pressure vessel and wherein the step of supplying the gaseous purge stream to the separator comprises the step of supplying the nonpermeate gaseous product stored in the secondary pressure vessel to the nonpermeate gas side of the separator.

6. A method of dehydrating a gaseous feed comprising a mixture of water vapor and at least another gas, the method comprising the steps of:
   intermittently conducting the gaseous feed under pressure through a membrane gas separator having at least one membrane through which water vapor permeates preferentially in comparison to the other gas to produce a nonpermeate gaseous product which is discharged from a nonpermeate gas side of the separator and in which the concentration of water vapor is lower than in the feed mixture;
   supplying at least a portion of the nonpermeate gaseous product to the nonpermeate gas side of the separator when the feed is not being conducted through the separator to purge residual amounts of water vapor contained in the membrane of the separator.

7. The method of claim 6 further comprising an intermediate step of storing at least a portion of the nonpermeate gaseous product in a pressure vessel and wherein the step of supplying at least a portion of the nonpermeate gaseous product to the separator comprises supplying at least a portion of the gaseous product from the pressure vessel to the nonpermeate gas side of the separator.

8. The method of claim 6 further comprising an intermediate step of storing at least a portion of the nonpermeate gaseous product in a pressure vessel and wherein the step of supplying at least a portion of the nonpermeate gaseous product to the separator comprises the steps of expanding at least a portion of the nonpermeate gaseous product from the pressure vessel and supplying the expanded product to the nonpermeate gas side of the separator.

9. The method of claim 8 wherein the step of expanding the nonpermeate gaseous product comprises allowing a portion of the nonpermeate gaseous product to bleed back through a slow-bleed check valve.

10. The method of claim 6 further comprising an intermediate step of storing a first portion of the nonpermeate gaseous product in a primary pressure vessel and storing a second portion of the nonpermeate gaseous product in a secondary pressure vessel and wherein the step of supplying at least a portion of the nonpermeate gaseous product to the separator comprises the step of supplying the product stored in the secondary pressure vessel to the nonpermeate gas side of the separator.

11. A system for separating a portion of a first gas from a gaseous feed comprising a mixture of gases that is intermittently supplied to the system, the system comprising a membrane gas separator having at least one membrane through which the first gas permeates preferentially in comparison to other gases contained in the mixture from a nonpermeate side to a permeate side of the separator, the separator being thereby adapted to produce a nonpermeate gaseous product which is discharged from the nonpermeate gas side of the separator and in which the concentration of the first gas is lower than in the feed mixture, and means for causing a portion of the nonpermeate gaseous product to flow back through the nonpermeate side of the separator as a purge stream when the feed mixture is not being supplied to the system, the concentration of the first gas being lower in the gaseous purge stream than in the feed mixture whereby to purge residual amounts of the first gas contained in the membrane of the separator.

12. The system of claim 11 further comprising a pressure vessel for storing the nonpermeate gaseous product and wherein the means for causing the gaseous purge stream to flow to the nonpermeate gas side of the separator comprises means for supplying a portion of the nonpermeate gaseous product from the pressure vessel to the nonpermeate gas side of the separator.

13. The system of claim 12 further comprising means between the pressure vessel and the nonpermeate gas side of the separator for expanding the purge stream prior to its being supplied to the separator.

14. The system of claim 13 wherein the means for expanding the purge stream comprises a slow-bleed check valve positioned to allow nonpermeate gaseous product to bleed back through the check valve to the nonpermeate gas side of the separator.

15. The system of claim 11 further comprising a primary pressure vessel for storing a first portion of the nonpermeate gaseous product and a secondary pressure vessel for storing a second portion of the nonpermeate gaseous product and wherein the means for supplying the gaseous purge stream to the separator comprises means for supplying nonpermeate gaseous product from the secondary pressure vessel to the nonpermeate gas side of the separator.

16. A system for dehydrating a gaseous feed that is intermittently supplied to said system, the gaseous feed comprising a mixture of water vapor and at least another gas, the system comprising a membrane gas separator having at least one membrane through which said water vapor permeates preferentially in comparison to the other gas, the separator being thereby adapted to produce a nonpermeate gaseous product which is discharged from a nonpermeate gas side of the separator and in which the concentration of water vapor is lower than in the feed mixture, and means for causing a portion of the nonpermeate gaseous product to flow back through the nonpermeate side of the separator as a purge stream when the feed mixture is not being supplied to the system, the concentration of water vapor being lower in the gaseous purge stream than in the feed mixture whereby to purge residual amounts of water vapor contained in the membrane of the separator.

17. The system of claim 16 further comprising a pressure vessel for storing the nonpermeate gaseous product and wherein the means for causing the gaseous purge stream to flow to the nonpermeate gas side of the separator comprises means for supplying a portion of the nonpermeate gaseous product from the pressure vessel to the nonpermeate side of the separator.

18. The system of claim 17 further comprising means between the pressure vessel and the nonpermeate gas side of the separator for expanding the purge stream prior to its being supplied to the separator.

19. The system of claim 18 wherein the means for expanding the purge stream comprises a slow-bleed check valve adapted to allow nonpermeate gaseous product to bleed back through the check valve and to the nonpermeate gas side of the separator.

20. The system of claim 16 further comprising a primary pressure vessel for storing a first portion of the nonpermeate gaseous product and a secondary pressure vessel for storing a second portion of the nonpermeate gaseous product and wherein the means for supplying the gaseous purge stream to the separator comprises means for supplying nonpermeate gaseous product from the secondary pressure vessel to the nonpermeate gas side of the separator.

21. The system of claim 16 wherein the nonpermeate gaseous product comprises air having a concentration of water vapor lower than the concentration of water vapor in the gaseous feed.

* * * * *